United States Patent Office 3,386,223
Patented June 4, 1968

3,386,223
METHOD OF JOINING DRYWALL PANELS
Arthur A. Wegwerth, St. Paul, Minn., assignor to Minnesota Mining and Manufacturing Company, St. Paul, Minn., a corporation of Delaware
No Drawing. Continuation-in-part of application Ser. No. 204,833, June 25, 1962. This application Feb. 1, 1966, Ser. No. 523,880
6 Claims. (Cl. 52—741)

ABSTRACT OF THE DISCLOSURE

A drywall jointing and filler composition which adheres well to gypsum drywall panels and metal which dries without visible shrinkage and which is easily sanded after drying, formed from inorganic friable hollow microbubbles and a quantity of a thermoplastic, nonhydrosettable, nonrubbery matrix adhesive, having a quantity approximately sufficient to fill the interstices among the microbubbles, the mixture containing a volatile vehicle mixture which permits careful control of the drying time.

---

This application is a continuation-in-part of our copending application S.N. 204,833, filed June 25, 1962, now abandoned.

This invention relates to the art of uniting or joining wallboard sections in drywall construction to provide smooth essentially-flat surfaces, and more particularly to new compositions for filling joints between drywall panels.

Due to the tendency of hydrosettable filler material to shrink and crack greatly on drying after application, the techniques used heretofore to unite drywall panels have generally required multiple application of filler material to a joint area, to arrive at a finished joint adequately filled and reasonably free of objectional cracking. Unfortunately, multiple application generally causes buildup of excess material which ultimately must be sanded away in order to smooth the joint to a plane essentially even with adjacent panel surfaces. Also, multiple application tends to cause the area covered with filler material to become wider and wider, as each succeeding coat is applied, resulting in increased labor and material costs.

The considerable time heretofore consumed in forming appropriately concealed joints between drywall panels has been due not only to the several applications of filler required, but also to the lengthy drying time required for hydrosettable filler compositions. Frequently only one application in one day has been possible.

In the case of covering or obliterating nail dimples, problems analogous to those aforenoted for the joint have confornted contractors installing drywall panels.

The art has long sought a reduction in the time required to unite or join drywall panels to provide a smooth essentially flat surface. This invention provides a solution to this problem as well as several others, as hereinafter noted.

By practicing this invention, joints between drywall panels may be filled with an amount of material more closely approximating that which ultimately remains in the area of the joint after the sanding step. A single application of my jointing compound is frequently sufficient to form a satisfactory filled and united joint ready for sanding. Even where my jointing compound is initially applied in "starved" condition, insufficient to level a joint with adjacent surfaces, only a single further application of compound is necessary to smooth over the joint area to prepare it for sanding.

A surprising feature of my jointing compound is its property of drying with essentially no shrinkage or at least no objectionable shrinkage detectable to the naked eye.

Insofar as is known, no one heretofore has been able to form such a composition for practical use in uniting drywall panels. In combination with lack of shrinkage, my jointing compound is easily sanded so as to reduce the time required for finishing before painting. It is easily applied by trowel or other suitable means without curling, crawling or crumbling during application. The compound, as it is applied, exhibits a buttery consistency permitting ease of application with conventional equipment (e.g., a squeeze box) to gain a smooth non-shrinking coating with nicely feathered edges. These results are not obtainable by conventional attempts to gain low shrinkage, such as the technique of using a low volatile content, which impairs the spreadability of the composition.

Advantageously the jointing compound of this invention may be controlled in its rate of drying within desired limits, preferably within a few hours time up to approximately 8 hours, or possibly more. In effect, the formulation of my compound may be so adjusted as to cause it to dry (or at least set up in its exposed surface portions) sufficiently within a brief period of time (e.g. a few hours) to permit early sanding and application of paint over the seam. The time consumed in forming a joint between drywall panels by practicing this invention as compared to prior art techniques may be reduced by as much as two-thirds or more.

Preferred jointing compounds of the invention contain organic solvents permitting them to be used even under freezing conditions without the loss of bond as experienced with conventional joint treatment compounds. These preferred formulations also remain stable under freezing conditions during transit and storage from a manufacturer to an ultimate user without impairment of properties required for drywall seam application.

The jointing compound of this invention contains spherical bodies which are a critical component of it. In fact, the bulk volume of spherical bodies in my jointing compound is essentially as great as the total "water-displacement" volume occupied by the total of the solids ingredients in it. They accordingly stabilize the volume of the jointing compound as it dries. These spherical bodies have been found to account for at least about 70%, preferably at least 80%, of the "water-displacement" volume of the solids ingredients in the jointing compound. They are inorganic, non-packing, low-density, essentially hollow, free-flowing, friable, spherical bodies having a diameter between about 5 and 300 microns hereinafter referred to as "microbubbles" or "spheroids." Preferably at least 80% (up to and including 100%) of them by volume have a diameter within the range of 10 to 150 microns. These inorganic microbubbles must be chemically inert to the organic binder matrix composition in which they are essentially uniformly dispersed to form the jointing compound. Their free-flowing and non-packing properties facilitate spreadability of the jointing compound. From the practical standpoint of sandability of the final composition in a filled joint, it is critical that the inorganic microbubbles possess a degree of fragility or brittleness. Fragility of inorganic microbubbles of useful characteristics generally decreases as their bulk average liquid displacement specific gravity or density increases (e.g., solid spheres are dense and are nearly impossible to sand). By "bulk average liquid displacement specific gravity" is meant the average liquid displacement specific gravity of the bulk or mass of microbubbles. In terms of bulk average liquid displacement specific gravity, the microbubbles should exhibit a value less than about 1.7. At very low values, i.e. below about 0.15, problems of extreme fragility are encountered when applying the jointing compound. Microbubbles of extremely low specific gravity tend to be crushed during troweling application, greatly increasing the shrinkage of the compound. Due to recent advances in the art of glass microbubble manufacture, it is now possible to form crush-resistant compositions using microbubbles having a bulk average liquid displacement specific gravity as low as 0.2 or even lower. Preferred bulk average liquid displacement specific gravity values for these bodies lie within the range of about 0.25 to 1.3, optimum results being obtainable within the range of about 0.3 to 1.2. Sandability of the final product becomes more difficult as the specific gravity of the microbubbles is increased. Thus microbubbles significantly above 1.6 specific gravity are not particularly desirable for use. Also, when microbubbles having a bulk average specific gravity significantly above 1.6 are used (and even when those much above 1.3 are used in some compositions), problems sometimes are encountered with respect to sagging of the jointing compound when applying it to unite wall panels. In addition, the mass becomes stiffer as microbubbles of higher and higher bulk average specific gravity are used. This is so because the binder consistency needed for microbubbles of higher specific gravity must be of higher viscosity and higher gel content in order to maintain the heavier microbubbles essentially uniformly distributed in suspension throughout the bulk of the liquid dispersed jointing compound.

The microbubbles must not contain any significant number of pores or openings through their outer skin into the space therewithin. Hollow unicellular microbubbles have been found to give best results; but satisfactory results may be obtained using multicellular microbubbles having a continuous external hole-free skin. Microbubbles satisfying the noted properties may be formed by using well-known teachings in the prior art. For example, clay microbubbles possessing the required properties may be formed by using blowing agents with clay particles and subjecting the same to heat in a stack. Techniques causing the formation of microbubbles containing a loosely held alkali content sufficient to react with the matrix adhesive portion of my jointing compound should not be used unless the resulting microbubble is treated to render it chemically inert to the matrix portion of the compound. A particularly preferred method of making microbubbles of satisfactory inert properties involves the steps of subjecting soda lime glass particles to carbon dioxide for absorption and thereafter passing the particles through a radiant heating zone where they reach sufficient temperatures to cause melting of the glass and simultaneous expansion of dissolved carbon dioxide so as to effect the formation of microbubbles while the particles are free falling.

Minute glass microbubbles of the aforedescribed type are added in proper volume relationship to a liquid-dispersed matrix adhesive, as will be described, to provide a final product which, when properly diluted with volatile vehicle, exhibits a buttery consistency for easy application to drywall. This result would appear particularly surprising in view of the large volume of the microbubbles required in the composition. Microbubbles account for between 70% and 95%, preferably between 80% and 92% of the water displacement volume of the total solids in the composition. It, therefore, is of major importance, in order to achieve buttery consistency of the final composition, that the solids constituents other than the microbubbles exhibit a proper balance of properties when dispersed in organic vehicle and water. Whether dry or emulsified or dispersed in organic solvent and water, the matrix as a whole must not exhibit that degree of tackiness commonly associated with pressure-sensitive adhesive. This is vitally important inasmuch as troweling and spreading of the composition, as well as ease of sanding, would be impossible if the matrix portion exhibited high tack.

This matrix portion is non-rubbery, possessing little or no extensibility as a dry film. It in fact appears to be somewhat brittle when studied as a dry film. This feature may be of practical significance from the standpoint of contributing to ease of sandability. Surprisingly, the matrix adhesive portion exhibits excellent adhesion to paper and gypsum drywall board when it is applied as part of my composition. It likewise possesses the property of adhering well to metals such as galvanized steel or aluminum, which metals are commonly employed for corner beads in the drywall industry.

Achievement of the required properties for the matrix portion of the jointing compound may be accomplished by using a blend of ingredients as hereinafter described, or by using other or equivalent ingredients or especially tailored ingredients which exhibit the combined properties discussed. An especially convenient way to achieve these properties, using conventional materials now on the market, is by blending together, in a manner hereinafter discussed, a non-hydrosettable mixture of ingredients including at least one film-forming thermoplastic organic resin which is at least in part water dispersible, plus at least one finely divided inorganic filler. The formulations are non-hydrosettable in that they do not set up by taking up water of crystallization. In preferred formulations, a mixture of organic materials is used including a water-insoluble water-dispersible thermoplastic organic resin, a water-soluble film-forming thermoplastic organic resin, and a water-dispersible non-film-forming organic polymer. Based on the total content of solids in the jointing compound, no more than about 20% thereof by volume should be accounted for by organic material; and preferably the volume of organic material is maintained between about 4 and 15% (or possibly lower than 10%) of total solids. As higher contents of organic film-forming resin are employed, sanding difficulty is increased. They tear rather than fragment, as is required for ease of sanding. However, at least 2% of film-forming resin by volume of total solids is usually employed. Of course, a variety of organic materials may be used effectively in my compound. Some illustrative ones are: vinyl acetate, vinyl chloride-vinylidene chloride copolymers, vinyl formvar, cellulosic resins, casein, starches, polyvinyl pyrrolidone, etc. Even an organic material such as glycerine may be employed, if desired, for plasticizing; but such an organic material should be used only with caution to avoid sanding problems.

While as little as 1% of the total volume of solids in the compound may consist of finely-divided inorganic filler (e.g., finely divided expanded perlite, asbestos, clays, pigments, etc.) it is generally preferable to employ somewhat greater amounts as an aid to gaining buttery conisstency; but no moe than about 15-16%, or possibly 25%, by volume should be employed.

In the following illustrative examples parts are by weight, with volume relationships also specified.

Example I

| Formulation No. | 1 | 2 | 3 |
| --- | --- | --- | --- |
| Part A: | | | |
| Polyvinyl butyral | 4.25 | 4.25 | 4.28 |
| Polyvinyl alcohol | 5.375 | 5.375 | 5.37 |
| Soybean protein polymer | 4.87 | 9.75 | 9.88 |
| Sodium pentachlorophenate | .12 | .625 | .32 |
| Morpholine | .60 | 1.25 | .62 |
| Monobasic sodium phosphate | 1.00 | 1.00 | |
| Finely divided water ground natural mica | 5.00 | 5.00 | |
| Xylol | 12.875 | 12.875 | 12.86 |
| Methyl pentynol | 12.875 | 12.875 | 12.86 |
| Water | 94.700 | 113.00 | 113.81 |
| Total parts | 141.665 | 166.00 | 160.00 |
| Part B: | | | |
| Part A mixture | 141.665 | 166.00 | 160.00 |
| Finely divided calcium carbonate (pigment size) | 30.00 | | |
| Finely divided silica flour (passing 400 mesh) | | 30.00 | 30.00 |
| Hollow glass microbubbles | 175.00 | 289.47 | 130.00 |
| Statistics: | | | |
| Diameter of hollow glass microbubbles in microns | 5–150 | 5–150 | 5–150 |
| Bulk average liquid displacement specific gravity | 1.0 | 1.6 | 0.5–0.6 |
| Volume of hollow glass microbubbles to total solids, percent | 87 | 86 | 90.7 |
| Volume of organic solids to total solids, percent | 6 | 7.6 | 5.4 |
| Volume of all finely divided inorganic powders to total solids, percent | 7 | 6.4 | 3.9 |

Polyvinyl butyral is a water-insoluble film-forming thermoplastic organic resin which in film form was noted to be slightly more brittle than polyethylene. It is commercially available under the trade name "Butvar B–98." While Butyrate resins, of which polyvinyl butyral is but one, are used frequently to gain adhesion to glass, it is not essential that a butyrate-type resin be employed to gain adhesion of the organic matrix portion of the jointing compound to the glass microbubbles present therein. Satisfactory results have been obtained by omitting anything resembling polyvinyl butyral from the composition, and by using proportionately larger amounts of polyvinyl alcohol or equivalent. Polyvinyl butyral is soluble in alcohols such as methyl pentynol; and solutions of it are readily dispersible or emulsifiable in water. It tends to inhibit flow of the matrix portion of the jointing compound. Generally it is not used in amount in excess of about 10% by volume, based on the total volume of solids in the compound.

Polyvinyl alcohol is a water-soluble film-forming thermo-plastic organic resin known sometimes as a water-activatible adhesive. It promotes adhesive bonding and is commercially available under the trade name "Gelvatol Resin 20–90." A film-forming thermoplastic resin of either the polyvinyl alcohol type or other type is included in my preferred compositions, generally in amounts sufficient to account for between 2 and 10 or possible 14% by volume of the total solids.

Soybean protein polymer is suitable characterized as a non-film-former (another such polymer is casein) which is insoluble in water but readily dispersible in water. It, in fact, is also insoluble in the organic solvents listed in the above formulations. It is believed that the soybean polymer largely functions in the formulations to improve spreadability and as an inhibitor of flow. As such, it may be replaced by non-film formers in particle form; and usually when non-film forming organic materials are employed, they will not be used in excess of about 12% by volume based on total solids. A suitable soybean protein polymer is available commercially in powdered form under the trade name "Adpro 444."

Sodium pentachlorophenate serves merely as a fungicide or preservative for organic materials such as polyvinyl alcohol and soybean protein resin. It is commercially available under the trade name "Dowicide G."

Monobasic sodium phosphate serves as a corrosion inhibitor. Nails are commonly used to affix gypsum wallboard to studdings. It has been found that a corrosion inhibitor such as monobasic sodium phosphate, when present in the composition, serves to retard or inhibit corrosion of metal nails and therefore preserves adhesion of the jointing compound to the same over a lengthy period.

Morpholine merely serves as a dispersant, although it may also exhibit a fungicidal function in the composition.

Suitable finely divided water-ground natural mica may be obtained under the trade name "4 Silkos." This product passes a 160 mesh standard U.S. sieve screen and serves as a filler for the matrix portion of the jointing composition. It also seems to improve the slip or butteriness of the composition, and usefully serves as a pigment to mask out underlying material when the composition is applied over a seam. A variety of finely divided fillers are useful.

The volatile organic vehicles or solvents and water in the composition are balanced as to quantity so as to achieve fast or slow drying times. Although fast drying of an applied layer of the composition is desired, drying of the composition during application is objectionable since it becomes stiffer and more difficult to apply in a smooth manner with well feathered edges. Thus, it has been found that extremely rapid drying is to be avoided; therefore substantial quantities of water, at least amounts about equal to or even twice the volume of volatile organic vehicle, should be present in the composition as it is applied. But the quantity of volatile orbanic vehicle should by volume at least account for about one-eighth, preferably at least one-fifth, or even more, of the total voltaile solvent or liquid in the composition where drying within a few hours, e.g., from about 2 to 6 hours under normal conditions, is desired. Of course, where the composition is destined to be used under freezing conditions, higher quantities of organic vehicle will be used to gain the balance of properties discussed herein.

Combining the inegredients of the above formulas to form the composition is suitably accomplished at room temperature as follows:

Polyvinyl butyral is dissolved in the xylol and methyl pentynol in Part A of the formulas.

Separately, the polyvinyl alcohol resin is dissolved in about two-thirds of the water in Part A.

In a further separate vessel, the soybean polymer, sodium pentachlorophenate, and morpholine are dispersed in the other one-third of the water in Part A. These materials disperse very well to provide a relatively stable opaque dispersion in water.

Then the three separate pre-mixes, plus the remaining Part A ingredients, are mixed together and formed into a uniform dispersion or emulsion in a high shear mixer such as for example a "Kadymill." Emulsification to achieve a uniform dispersion is suitably accomplished within about 3 to 5 minutes. It seems to impart improved resistance to flow of the mixture and also improves spreadability of the final product.

Part B ingredients, including the product of emulsification, are then blended into a uniform consistency, suitably by using a conventional dough mixer.

Thereafter, if necessary for the viscosity desired, the blended composition is diluted with water to achieve a viscosity preferably between about 300,000 and 500,000 centipoises. In this range, the composition exhibits a soft buttery consistency. Only very little water may be needed to achieve proper viscosity. At viscosities higher than 500,000 centipoises, say at 600,000 centipoises, the composition is usually too thick for proper application. At lower viscosities, e.g. 200,000 centipoises or lower, the product flows too much for controlled application, unless thixotropic agents (for example, ammonium bentonites) are added. In such cases, it may even be desirable to use lower viscosities.

While viscosity, or more properly, the flow characteristics of the composition must be maintained within limits to achieve the desired buttery and handleability characteristics (e.g., spreadability and lack of flow out of place during application) for application of the composition to form drywall seams, it should not be overlooked that the composition may be marketed as a product of commerce in special high viscosity concentrated form, if such is desired. Under such circumstances the viscosity of the product as marketed may be considerably higher than desired for application, and may be reduced within the range desired for application by dilution with water or possibly even volatile organic solvents. Such, however, must be accomplished with care in order to gain a uniform blending of the additions at the time of application.

The formulations illustrated, applied to drywall seams as a spreadable mass having a viscosity between 300,000 to 400,000 centipoises, have been found to dry within 2 to 8 hours after application. The shorter drying times have been observed where higher temperatures and lower humidities have been present. After application of the compound, the "open" time during which it may be troweled and re-shaped is about 5 to 15 minutes, depending again on environmental conditions. The applied material adheres well and does not seem to shrink or crack on drying, even though the volume of matrix solids may be as low as to leave intersticial voids in the dried material. It is easily sanded (formulation 2 above being the most difficult to sand from a relative standpoint, but not objectionably difficult). The resulting steam cover is satisfactorily tough and scuff-resistant so as to perform in these respects almost analogously to gypsum wallboard itself. Advantageously, the seam of dried and sanded jointing compound exhibits surface characteristics of desirable similarity to the surface characteristics of gypsum drywall when the entire wall surface is covered with a film of paint. Thus, the painted surface appears as a monolithic surface as desired.

EXAMPLE II

| Ingredient | Trade Name | Parts by weight |
|---|---|---|
| Polyvinyl Acetate (55% solids) | Vinac WR-50 | 23.5 |
| Calcium Carbonate | Lesamite | 9.35 |
| Methyl Cellulose, 1,500 c.p.s. | Methocel | .85 |
| Polyacrylic Acid | Acrysol A-3 | .68 |
| NH$_4$OH | | .23 |
| Sodium Phosphate Monobasic | | .47 |
| Sodium Pentachlorophenate | Dowicide G | .14 |
| Diethylene Glycol Monoethyl Ether | Carbitol | 1.75 |
| Glass Microbubbles, Sp. Gr. 0.40, 5-150 microns | 3M #B-40-Pl | 29.60 |
| H$_2$O | | 35.70 |
| Total | | 102.57 |

Statistics: Volume percent of solids
- Binder _____ 12.6
- Bubbles _____ 82.2
- Other _____ 5.2

The preferred polyvinyl acetate emulsion consists of a 55% solids water dispersion of a homopolymer of vinyl acetate of approximately 0.5 micron particle size having a viscosity of 1200–1800 centipoises. The preferred emulsion, commercially available under the trade name Vinac WR-50 provides a desirable combination of properties including rapid film formation, water resistance, and excellent adhesion. Methyl cellulose and polyacrylic acid act as bodying or gelling agents to provide a non-sag consistency, i.e., a viscosity of 200,000 to 300,000 centipoises in the case of the formulation based on vinyl acetate. NH$_4$OH acts as a basic medium to cause solubilization of the polyacrylic acid. Variations in open times and/or set times can be achieved by varying the amount of diethylene glycol monoethyl ether, which is a very high boiling liquid with very low volatility that inhibits the evaporation of the water from the product thereby giving longer work life.

The same jointing compound employed for seams between drywall panels may be used for spackling or covering nail dimples or repairing old cracks. Thus the user is free of the necessity of selecting special preparations for each type of job. Additionally, workmen are relieved of the necessity of using exotic solvents to clean tools when using my jointing compound. Mere alcohol in water, or water alone, is entirely effective as a clean fluid.

What is claimed is:

1. In a method of joining drywall panels by applying to said panels a jointing and filler composition having a buttery consistency which adheres well to gypsum drywall panels and is easily sanded after drying, comprising solid ingredients essentially uniformly dispersed in a volatile liquid vehicle mixture of water and at least one organic solvent, said solids consisting essentially of a thermoplastic organic matrix adhesive which is relatively brittle and inextensible in the dry state and is substantially free of hydrosettable constituents and contains at least 2% by volume of total solids of a film forming thermoplastic organic resin soluble in said liquid mixture, the improvement which comprises between 70% and 95% of said composition by volume being friable free-flowing inorganic hollow glass spheroids having an average diameter between about 5 and 300 microns and a bulk density water displacement specific gravity between about 0.2 and 1.7 said matrix adhesives forming the remaining 5 to 30% by volume of said solids and allowing said mixture to dry without substantial shrinkage.

2. A method according to claim 1 wherein said matrix adhesive comprises polyvinyl acetate.

3. A method according to claim 1 wherein said matrix adhesive comprises a mixture of polyvinyl butyral and polyvinyl acetate.

4. A method according to claim 1 wherein said composition comprises 1 to 16% of a finely divided inorganic filler.

5. In a method of filling depressions, such as cracks, nail dimples, and joints between drywall panels, in wall surfaces comprising applying to said wall surfaces a jointing and filler comosition which is easily sanded after drying, comprising solid ingredients uniformly dispersed in a volatile liquid vehicle mixture of water and at least one volatile organic solvent, said liquid vehicle mixture being present in an amount sufficient to provide a buttery paste-like consistency to the mixture, said solid ingredients consisting of a quantity of thermoplastic orgnaic matrix adhesive which is relatively brittle and inextensible in the dry state and is essentially free of hydrosetting constituents, the improvement which comprises said matrix adhesive being highly filled with a massive friable free-flowing glass microbubbles chemically inert to said matrix adhesive having diameters within the range of 5 to 300 microns and a bulk density liquid dsiplacement specific gravity between 0.2 and 1.7, said micromubbles being present in an amount such that just enough of said matrix adhesive is present to approximately fill the interstitial spaces between said microbubbles, said microbubbles forming between about 70% and 95% by volume of said composition, and allowing said composition to dry without visible shrinkage.

6. A method according to claim 5 including the further step of sanding said composition to provide a smooth surface.

References Cited
UNITED STATES PATENTS

| 2,396,607 | 3/1946 | Rogers | 260—8 |
| 2,487,207 | 11/1949 | Adams | 260—2.5 |
| 2,544,146 | 3/1951 | Erikson | 260—8 |
| 2,797,201 | 6/1957 | Veatch et al. | 260—2.5 |
| 2,806,509 | 9/1957 | Bozzacco et al. | 260—2.5 |
| 3,003,979 | 10/1961 | Ptasienski et al. | 260—29.6 |
| 3,053,676 | 9/1962 | Higbee | 260—8 |

MURRAY TILLMAN, *Primary Examiner.*

G. F. LESMES, *Examiner.*

J. C. BLEUTGE, *Assistant Examiner*